(12) United States Patent
Kikuchi et al.

(10) Patent No.: US 6,664,670 B2
(45) Date of Patent: Dec. 16, 2003

(54) AUTOMATIC BALANCING APPARATUS

(75) Inventors: Yoshimi Kikuchi, Nagano (JP); Daisuke Higuchi, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/798,728

(22) Filed: Mar. 2, 2001

(65) Prior Publication Data

US 2002/0047337 A1 Apr. 25, 2002

(30) Foreign Application Priority Data

Mar. 9, 2000 (JP) ........................................ 2000-064656

(51) Int. Cl.[7] ............................................... H02K 5/24
(52) U.S. Cl. ..................... 310/51; 74/573 R; 369/263
(58) Field of Search ............................... 310/51, 67 R; 74/572, 573 R, 574; 360/98.07, 99.04, 99.05, 99.08; 369/263

(56) References Cited

U.S. PATENT DOCUMENTS

| | | | | |
|---|---|---|---|---|
| 3,733,923 A | * | 5/1973 | Goodrich et al. | 188/378 |
| 5,806,349 A | * | 9/1998 | Kim et al. | 68/23.2 |
| 6,005,311 A | | 12/1999 | Matsushima | 310/51 |
| 6,205,110 B1 | * | 3/2001 | Miyamoto et al. | 360/99.08 |
| 6,252,319 B1 | * | 6/2001 | Sudo et al. | 310/51 |
| 6,281,608 B1 | * | 8/2001 | Matsushima | 310/51 |
| 6,388,981 B1 | * | 5/2002 | Sohn et al. | 360/99.08 |

* cited by examiner

*Primary Examiner*—Dang Le
(74) *Attorney, Agent, or Firm*—Hogan & Hartson, LLP

(57) ABSTRACT

An automatic balancing apparatus may be mounted in a rotator body such as a spindle motor having a rotary shaft defining an axis of rotation. The automatic balancing apparatus has a plurality of balancing members rotatable about the axis of rotation in a non-contact manner. Each of the balancing members has a balance action section spaced a distance in a radial direction from the axis of rotation and a connection section that rotatably couples the balance action section to the axis of rotation. The balance action section has a mass that effects a balance correction action to cancel a rotational unbalance of the rotator body when the rotator body rotates at a rotational speed that exceeds a resonant rotational speed CR thereof. The connection section has a mass that substantially does not affect the balance correction action compared to the balance action section.

14 Claims, 11 Drawing Sheets

AUTOMATIC BALANCING APPARATUS

BACKGROUND OF THE INVENTION

1. Field of the Invention

The present invention relates to an automatic balancing apparatus and a motor with a function to cancel rotational unbalances of a rotary body.

2. Description of Related Art

Automatic balancing apparatuses are often implemented in various rotary driving apparatuses that are used in industrial machines, home electric appliances, computers and the like. An automatic balancing apparatus is employed in a rotary body such as a rotary driving apparatus including a rotor shaft to cancel out rotational unbalances of the rotary body. Japanese laid-open patent applications HEI 10-257710 and HEI 11-178272 describe such automatic balancing apparatuses.

For example, Japanese laid-open patent application HEI 10-257710 describes a balancing member 3 provided about a rotor shaft of a motor 1, as shown in FIG. 12. The balancing member 3 is formed from a disc-like case body having an internal space provided therein. Plural ball members 4 are movably disposed within the space of the balancing member 3. When the rotational speed of the motor 1 exceeds its resonant rotational speed CR, the ball members 4 start moving in an opposite direction with respect to the position of center of gravity of a rotator body that includes the rotor shaft 2 and the balancing member 3, to thereby balance the rotator body. As a result, vibrations of the rotator body are reduced and the rotation thereof is stabilized.

However, in the automatic balancing apparatus described above, the plural ball members 4 tend to become unstable when the rotational speed of the motor 1 is below the resonant rotational speed CR, such that the ball members 4 collide against one another and make colliding noises and may be damaged. Moreover, the contact resistance among the ball members 4 becomes large at high-speed rotations when the viscosity of flowing air increases. As a result, the ball members 4 cannot be accurately disposed at appropriate balancing positions, and thus the rotary body cannot be sufficiently stabilized.

An automatic balancing apparatus described in Japanese laid-open patent application HEI 11-178272 has fan-shaped balancing members 5 rotatably disposed about a rotor shaft 6, as shown in FIG. 13. The automatic balancing apparatus described in Japanese laid-open patent application HEI 11-178272 generally solves the problems described above.

However, in the automatic balancing apparatus of the Japanese laid-open patent application HEI 11-178272, each of the balancing members 5 has a generally fan-like shape as viewed in plan, and therefore has to be made relatively large. This results in a problem in that the overall size of the automatic balancing apparatus becomes large.

SUMMARY OF THE INVENTION

It is an object of the present invention to provide an automatic balancing apparatus having a smaller and simplified structure that achieves an optimum balance correction action of balancing members.

It is another object of the present invention to provide an automatic balancing apparatus that has an improved rotational stability particularly at a low rotational speed range.

In accordance with one embodiment of the present invention, an automatic balancing apparatus may have a plurality of balancing members rotatable about the axis of rotation, each of the balancing members having a balance action section spaced a specified distance in a radial direction from the axis of rotation and a connection section that rotatably couples the balance action section to the axis of rotation. The balance action section has a mass that effects a balance correction action, and the connection section has a mass that substantially does not affect the balance correction action compared to the balance action section.

By the embodiment of the present invention having the structure described above, the center of gravity of each of the balancing members is shifted more outwardly from the rotor shaft in the radial direction compared to the conventional automatic balancing apparatus having fan-shaped balancing members, such as the one described in Japanese laid-open patent application HEI 11-178272. As a result, a smaller sized automatic balancing apparatus can achieve a better balance correction action.

In accordance with one embodiment of the present invention, the balance action section may have a balance storage section having an outer abutting surface and a balancing mass freely moveable in the balance storage section. The abutting surface may be in an arcuate form. The balancing mass is supported by the abutting surface when a rotator body on which the automatic balancing apparatus is mounted is operated at speeds that exceed a resonant rotational speed CR of the rotator body. As a result, the center of gravity of the balancing member is further shifted outwardly in the radial direction, and therefore a further miniaturization can be achieved.

The balancing mass may be formed from a globular body such as a ball that can readily move in response to a rotational unbalance. As a result, the sensitivity in the balance correction action can be increased. Also, each of the balancing members may be provided with a single globular body, such that the globular bodies are disposed isolated from one another. Accordingly, there is no collision between the globular bodies, and therefore generation of noises and damages to the globular bodies can be securely prevented.

In accordance with one embodiment of the present invention, the balance storage section has a retaining recessed section that retains the balancing mass in a region closer to the axis of rotation than the outer abutting surface in a low rotational speed range below the resonant rotational speed CR. The retaining recessed section may be provided with a step difference having a height in which the balancing mass can move out of the step difference of the retaining recessed section by a centrifugal force generated when the rotator body rotates at a speed exceeding the resonant rotational speed CR thereof. As a result, when the rotator body rotates in a low rotational speed range below the resonant rotational speed CR thereof, the balancing mass is retained in the retaining recessed section in a balanced state. As a result, when the rotator body starts its rotational operation again or in the low rotational speed range, the rotator body stably rotates in the balanced state.

In accordance with one embodiment of the present invention, the balancing mass may be formed from liquid that can freely change its configuration. As a result, the balance storage section can also be changed to any appropriate shape, which improves the degree of freedom in designs.

In accordance with one embodiment of the present invention, the balance action section may be formed from a solid metal weight that is attached to an outer end section of the connection section that extends in the radial direction. As a result, the center of gravity of the balancing member is further shifted outwardly in the radial direction by the metal weight, and therefore a further miniaturization can be achieved.

In accordance with one embodiment of the present invention, an automatic balancing apparatus may have a plurality of balancing members rotatable about the axis of rotation, each of the balancing members having a circular main body rotatable about the axis of rotation and an unbalance section that is formed by removing a portion of the circular main body.

As a result, a mass required for a balance correction action can be effectively secured along an entire peripheral region of the circular main body section. As a result, the automatic balancing apparatus of the present invention can be reduced in size and thickness for a given mass, compared to the conventional apparatus having fan-shaped balancing members having the same mass. Accordingly, the entire structure of the apparatus can be reduced in size and thickness.

By the use of the circular main body, an extreme cantilever structure of the conventional apparatus can be eliminated, and therefore highly stable rotational operations can be obtained from a low rotational speed state to a high rotational speed state. Accordingly, an excellent balance correction action of the balancing members can be achieved with a simplified and smaller structure, and also the rotation stability is improved.

In accordance with one embodiment of the present invention, the unbalance section is defined by a recessed section formed by removing a portion of the circular main body. The recessed section may be a through hole formed in the circular main body. As a result, even when the size of the unbalance section is changed, its center of gravity does not change, and therefore the mass of the balancing member is readily adjusted.

In accordance with one embodiment of the present invention, each of the balancing members may have a central circular section rotatable about the axis of rotation, an unbalance section spaced a distance from the axis of rotation and a connection section that connects the unbalance section to the central circular section. The unbalance section has a mass that effects the balance correction action, and the central circular section may have a mass greater than the mass of the unbalance section. As a result, an extreme cantilever structure of the conventional apparatus can be eliminated, and highly stable rotational operations can be obtained from a low rotational speed state to a high rotational speed state.

In accordance with one embodiment of the present invention, the automatic balancing apparatus may have a rotational retaining member that rotates the balancing members together with the rotary shaft in a low rotational speed region below the resonant rotational speed CR. In one embodiment, the rotational retaining member has a support section that is rotatable with the rotor shaft and a circular sliding-contact section provided on an outer periphery of the support section surrounding the entire periphery of the balancing members. The sliding-contact section may be in contact with the periphery of the balancing members. The sliding-contact section may be formed from a flexibly deformable material that is in contact with an outer periphery of each of the balancing members in the low rotational speed region and separated outwardly in the radial direction from the peripheral surface of each of the balancing members in a high rotational speed region exceeding the resonant rotational speed CR.

Since the rotational retaining member has the circular sliding-contact section that surrounds the entire periphery of the balancing members, the balancing members can be retained by the rotation retaining section no matter what angular positions the balancing members are located. Therefore, once the balancing members are placed in a balanced state, the sliding-contact section retains the balancing members in the balanced state even at a start of a next rotational operation of the rotator body. As a result, the rotation stability is improved particularly in the low rotation speed region, and the balancing members can move smoothly and quickly in a short time to appropriate locations for balancing actions in the high rotation speed region.

In accordance with one embodiment of the present invention, the plurality of balancing members may include a pair of balancing members provided in the axial direction and the rotational retaining member may include a pair of rotational retaining members provided opposing to each other in the axial direction for the pair of balancing members, respectively. Each of the circular sliding-contact sections of the rotational retaining members may include sliding-contact segments. The sliding-contact segments of one of the rotational retaining members and the sliding-contact segments of the other of the rotational retaining members may be alternately disposed in a peripheral direction in a non-contact manner. As a result, the pair of the rotational retaining members evenly exert the retaining actions on the pair of the corresponding balancing members, respectively, such that the balance correction action is more accurately achieved.

Other features and advantages of the invention will be apparent from the following detailed description, taken in conjunction with the accompanying drawings that illustrate, by way of example, various features of embodiments of the invention.

PREFERRED EMBODIMENTS OF THE PRESENT INVENTION

Preferred embodiments of the present invention are described below with reference to the accompanying drawings.

Figure 1:
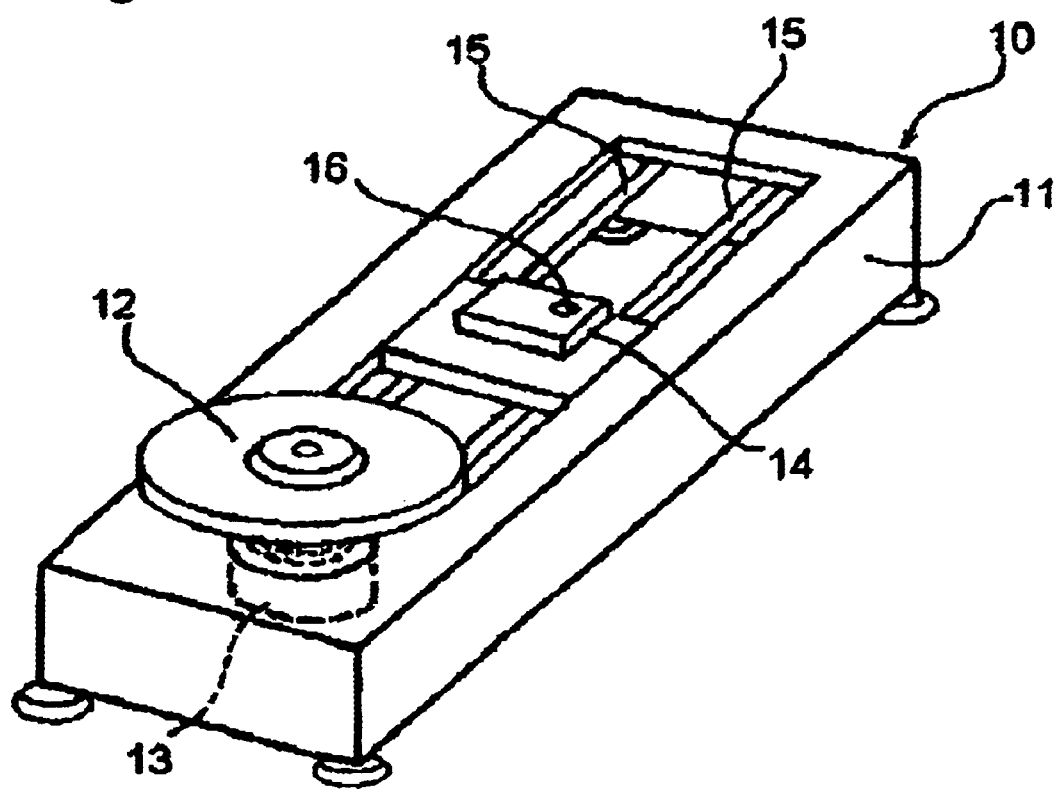
FIG. 1 shows a perspective view of a CD-ROM drive unit employing an automatic balancing apparatus in accordance with one embodiment of the present invention.

First, an overall structure of a CD-ROM drive unit 10 having an automatic balancing apparatus in accordance with an embodiment of the present invention is described. The CD-ROM drive unit 10 shown in FIG. 1 includes a chassis 11 that is equipped with a spindle motor 13 that rotatably drives a recording disc 12, and an optical pickup apparatus 14 that emits a laser beam onto the disc 12 to write or read data on the disc 12. The recording disc 12 is placed on a disc table 137 that is mounted on the motor 13 (see FIG. 2).

The optical pickup apparatus 14 is reciprocally mounted on a pair of horizontally extending guide shafts 15 that are affixed to the chassis 11. The optical pickup apparatus 14 includes a system that guides a light beam emitted from a laser light source (not shown) through an objective lens 16 onto the disc 12, and detects a reflected light that is reflected on the disc.

The motor 13 includes a cylindrical tubular bearing holder 132 that is mounted on a main frame 131 of the CD-ROM drive unit 10. The bearing holder 132 generally vertically extends with respect to the main frame 131. Bearing members 133 are pressure-inserted in a central bore of the bearing holder 132. A circular protruded retaining section (not shown) is formed on an internal surface of the central bore of the bearing holder 132 about a central area of the bearing holder 132 along the axial direction. The bearing members 133 are abutted to the circular retaining section and thereby fixed at specified locations. Oil-retaining bearings, ball bearings, dynamic pressure bearing apparatuses or the like may be employed as the bearing members 133.

A rotor shaft 134 is rotatably supported by the bearing members 133 at the center of the bearing holder 132. A stator core 135 that is formed from stacked layers of silicon steel plates is mounted on an outer peripheral surface of the bearing holder 132. The stator core 135 has salient poles and is coated on its surface by an insulation layer. A winding 136 is wound around each of the salient poles through the insulation layer.

A generally circular disc table (e.g., turntable) 137 is affixed on an upper section of the rotor shaft 134. A pair of balancing members 21 that form an automatic balancing apparatus 20 (to be described below) are rotatably mounted with respect to the rotor shaft 134 through bearing members 22 on the underside of the disc table 137. The disc table 137 may be provided with a central hole that is pressure-inserted over the rotor shaft 134 whereby the disc table 137 is affixed to the rotor shaft 134. Alternatively, the disc table 137 and the rotor shaft 134 may be integrally formed in one piece. The disc table 137 includes a circular positioning protrusion 137a generally having a truncated conical shape that retains a disc (e.g., the disc 12 shown in FIG. 1) at a predetermined position on the disc table 137.

A cylindrical tubular rotor case 130 is mounted on an outer peripheral section of the disc table 137, and a circular rotor magnet 139 is affixed to an internal surface of the case 138. An internal surface of the magnet 139 is disposed in proximity of the salient poles of the stator core 135.

Next, a structure of the automatic balancing apparatus 20 is described with reference to FIGS. 2 and 3.

The pair of balancing members 21 are rotatably mounted on the rotor shaft 134 through the bearing members 22, such as ball bearings, metal bearings or the like. Alternatively, the balancing members 21 may be directly mounted on the rotor shaft 134 in a rotatable manner. By the balance correction action of the automatic balancing apparatus 20 that has the two balancing members 21, rotational unbalance of the rotator body including the rotor shaft 134 and the disc table 137 is canceled out when the rotator body is rotated at a rated rotational speed exceeding its resonant rotational speed CR.

In one embodiment, each of the balancing members 21 includes an arm-like connection section 211 extending outwardly in a radial direction from the rotor shaft 134 and having a generally uniform width along its longitudinal direction. A generally arcuate balance action section 212 is provided on an external end section of each of the connection sections 211. Each of the balance action sections 212 has a direct influence upon the balance correction action of the automatic balancing apparatus 20, and therefore has a mass that is required for the balance correction action. On the other hand, each of the arm-like connection sections 211 may be formed from a thin and narrow strip-like member such that its mass becomes as small as possible in order not to substantially affect the balance correction action. Each of the balance action sections 212 is separated from the length of each of the respective connection sections 211 from the rotor shaft 134.

Figure 2:
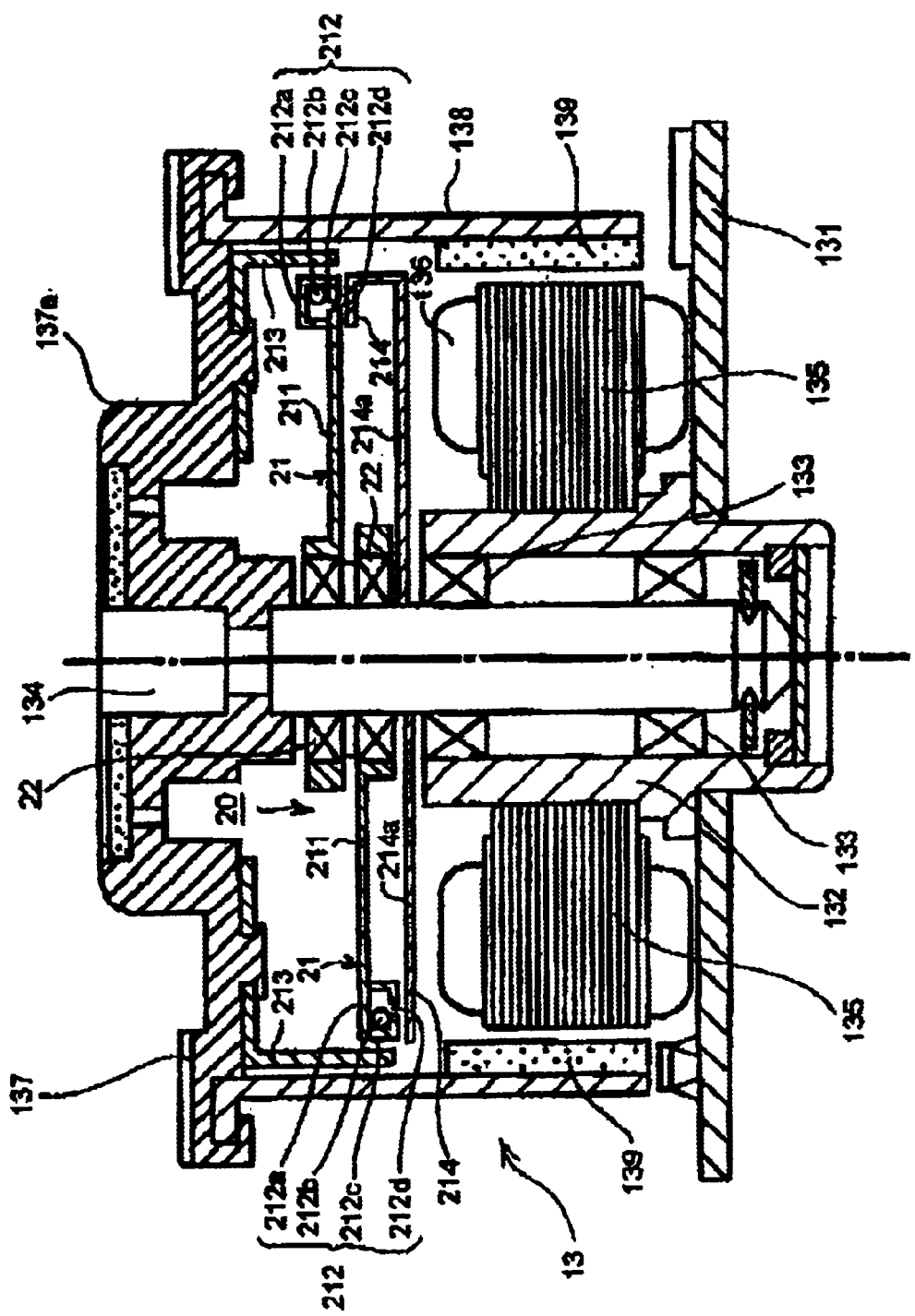
FIG. 2 shows a cross-sectional view of a motor having an automatic balancing apparatus in accordance with one embodiment of the present invention used in the CD-ROM drive unit shown in FIG. 1.
Figure 3:
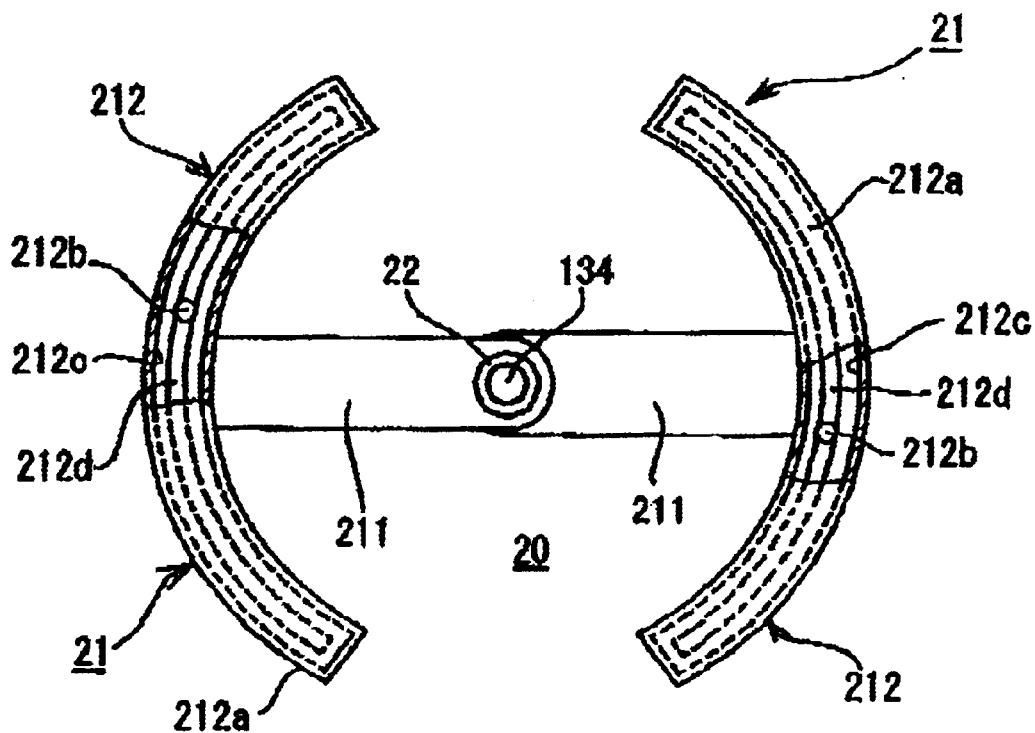
FIG. 3 shows a plan view of the automatic balancing apparatus shown in FIG. 2.

The pair of the balance action sections 212 are disposed in a manner that the balance action sections 212 overlap each other in the axial direction as shown in FIG. 2, and that the balancing members 21 do not contact each other when the balancing members 21 rotate about the rotor shaft 134. Rotation retaining members 213 composed of spring members are disposed opposite to one another around outer peripheries of the balance action sections 212. When the rotator body is in a low speed rotation range between a stopped state in which the rotator body is stopped and a rotational speed that does not exceed the resonance rotation speed CR, the rotation retaining members 213 contact and engage the balance action sections 212, such that the rotator body rotates with the balancing members 21 in one body. When the rotator body is in a high speed rotation range in which a rotational speed of the rotator body exceeds the resonance rotation speed CR, the rotation retaining members 213 are released from the balance action sections 212 by a centrifugal force, as shown in FIG. 2. As a result, the balancing members 21 can freely rotate.

Each of the balance action sections 212 has a balance storage section 212a that is formed from a case member in a generally arcuate shape with respect to the rotor shaft. Each of the balance storage sections 212a has an internal space that moveably stores a balancing mass body 212b. The balancing mass body 212b may be formed from a single globular body, such as a ball-shaped member. The balance storage sections 212a that are provided on the respective balance action sections 212 are disposed in a manner that the balance storage sections 212a protrude from the connection sections 211 in opposite directions in the axial direction. More specifically, the balance storage section 212a on the right-hand side of FIG. 2 is in a box shape in cross section that protrudes upwardly. On the other hand, the balance storage section 212a on the left-hand side of FIG. 2 is in a box shape in cross section that protrudes downwardly.

Each of the balance storage sections 212a is provided with an outer abutting surface 212c that retains the internal balancing mass body 212b when the rotator body rotates at rated rotational speeds that exceed the resonant rotational speed CR of the rotator body. In a preferred embodiment, the abutting surface 212c may be curved in an arcuate shape.

Furthermore, each of the balance storage sections 212a is provided with a retaining recessed section 212d for retaining the internal balancing mass body 212b that is separated from the outer abutting surface 212c when the rotator body rotates at low rotational speeds below the resonant rotational speed CR of the rotator body. Each of the retaining recessed sections 212d may be formed from a generally arcuate groove section located slightly inside the outer abutting surface 212c in the radial direction. When the rotator body stops its rotation or in low rotational speeds below the resonant rotational speed CR of the rotator body, the balancing mass body 212b is separated from the outer abutting surface 212c and drops into the retaining recessed section 212d, such that the balancing mass body 212b is retained in a region slightly inside the outer abutting surface 212c in the radial direction.

Bottom support plates 214 are provided immediately below and in proximity to the retaining recessed sections 212d. When the balancing mass bodies 212b are in the retaining recessed sections 212d, the balancing mass bodies 212b are supported on the bottom support plates 214. The bottom support plates 214 are formed in portions of a circular disc member 214d at mutually opposite locations across the diameter of the circular disc member 214d. The bottom support plates 214 are formed with a step difference in the axial direction corresponding to a step difference between the balance storage sections 212a that are disposed in a manner to mutually overlap in the axial direction.

Furthermore, a step difference is formed in the axial direction between an upper surface of each of the bottom support plates 214 and groove edges of each of the respective retaining recessed sections 212d. The amount of the step difference is set such that the balancing mass bodies 212b can move over the step difference and move outwardly by a centrifugal force generated when the rotator body is rotated at speeds exceeding the resonant rotational speed CR.

In the automatic balancing apparatus having the structure described above in accordance with the embodiment of the present invention, when the rotator body is in the low rotational speed range between a stopped state in which the rotator body is stopped and a rotational speed that does not exceed the resonance rotation speed CR, the two balancing members 21 are located in mutually opposing areas about the rotor shaft 134 at a center angular angle of about 180 degree. Furthermore, the balancing mass bodies 212b stored in the balance storage sections 212a of the respective balancing members 21 are retained at balanced locations by the respective retaining recessed sections 212d. Also, since the balancing members 21 rotate together with the rotator body by the retaining action of the rotation retaining members 213, a relative rotational speed difference between the balancing members 21 and the rotator body is zero "0", such that a balance correction action (to be described below) can be quickly attained.

As the rotational speed of the spindle motor 13 increases, the centrifugal force increases. When the rotational speed of the spindle motor 13 reaches speeds of about the resonant rotational speed CR, the retaining action of the rotation retaining members 213 acting on the balancing members 21 is released by the centrifugal force. As a result, the balancing members 21 are allowed to rotate free from the rotor shaft 134. When the rotational speed of the spindle motor 13 exceeds the resonant rotational speed CR, the balancing members 21 and the balancing mass bodies 212b that are allowed to rotate free from the rotor shaft 134 move in directions to cancel an eccentric center of gravity of the rotator body, in other words, a so-called withdrawing phenomenon takes place to cause a balance correction action upon the rotator body.

In this manner, for example, when a disc having a rotational unbalance is rotated on the rotator body, the balancing members 21 and the balancing mass bodies 212b move on their own by the balance correction action to appropriate positions, whereby the position of a resultant center of gravity of the rotator body and the disc is located on the rotor shaft 134. As a result, the rotor body rotates without vibrations. Accordingly, even when a disc having a rotational unbalance is rotated on the disc table 137, the disc can be rotated without vibrations since the rotator body can be rotated with the resultant center of gravity being located on the rotor shaft 134.

On the other hand, when the rotational speed of the rotator body is reduced after the automatic balancing action has taken place, the rotation retaining members 213 come in contact with the balancing members 21 such that the rotation retaining members 213 retain the balancing members 21. At this moment, the rotator body does not have an eccentricity in the center of gravity because the balancing members 21 and the balancing mass bodies 212b are located in the positions that cause a balanced state. As a result, the rotation retaining members 213 retain the balancing members 21 in the balanced state in which the eccentricity in the center of gravity of the rotator body is canceled out. Even after the rotation of the spindle motor 13 is stopped, the rotator body maintains its balanced state. Therefore, the spindle motor 13 can resume its rotation smoothly because an unbalance is not present in the rotator body due to the balancing members 21 and the balancing mass bodies 212b.

In accordance with the embodiment of the present invention, the position of the center of gravity of each of the balancing members 21 is located further outside from the center of rotation in the radial direction compared to, for example, the fan-shaped balancing member described in Japanese laid-open patent application HEI 11-178272. As a result, even when the balancing members 21 are reduced in size, a good balance correction action is attained. In addition, since the position of the center of gravity of each of the balancing members 21 can be shifted further outside from the center of rotation, the external diameter of the automatic balancing apparatus 20 can be substantially reduced and sufficient miniaturization of the automatic balancing apparatus 20 can be achieved when a balance correction action comparable to the conventional apparatus is required.

Also, in accordance with the embodiment of the present invention, globular body members such as balls are used as the balancing mass bodies 212b. Since globular body members can quickly respond to rotational unbalances and readily move, the sensitivity in the balance correction action can be increased. Also, each of the balancing members 21 is provided with a single globular body member such as a single ball (i.e., the balancing mass body 212b), and the balancing mass bodies 212b are disposed isolated from one another. Accordingly, there is no collision between the balancing mass bodies 212b, and therefore generation of noises and damages to the balancing mass bodies 212b can be prevented well.

Furthermore, in accordance with the embodiment of the present invention, when the rotator body is rotating in a low rotational speed state (e.g., at low rotational speeds), the balancing mass bodies 212b are retained in the retaining recessed sections 212d in a balanced state. As a result, the rotator body can stably rotate in the balanced state when the rotator body resumes its rotation or rotates at low rotational speeds in the next operation.

Figure 4:
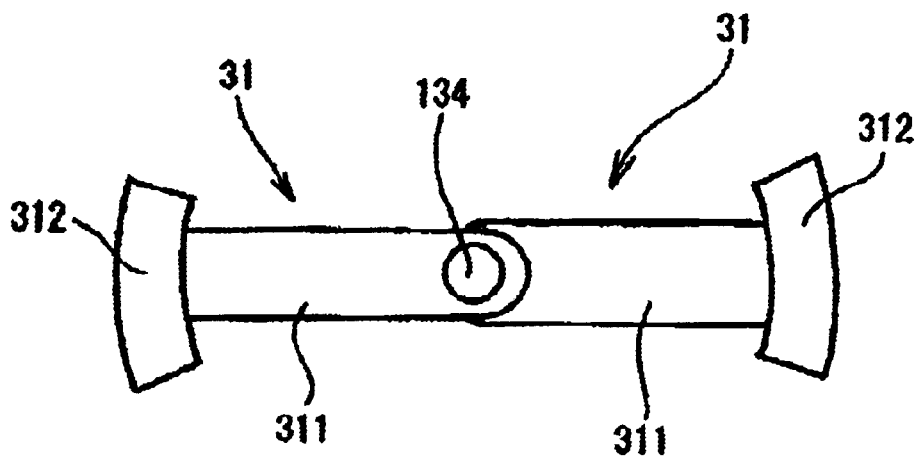
FIG. 4 shows a plan view of the automatic balancing apparatus in accordance with another embodiment of the present invention.

FIG. 4 shows balancing members 31 in accordance with another embodiment of the present invention. The balancing members 31 have connection sections 311 and balance action sections 312 provided at end sections of the connection sections 311. In this embodiment, the balance action sections 312 are formed from metal weights. In one embodiment, the balance action sections 312 are formed from solid metal weights. By using metal weights with higher density as the balance action sections 312, the position of the center of gravity of each of the balancing members 31 is effectively shifted outwardly in the radial direction, with the result that further reduction in diameter and further miniaturization can be achieved.

Figure 5:
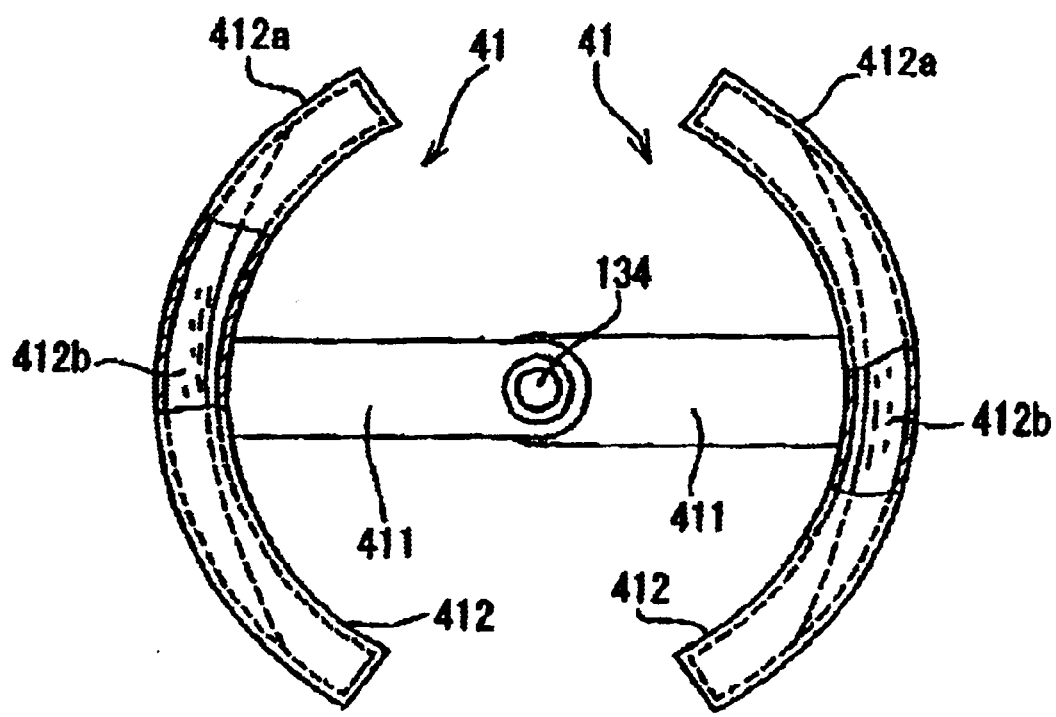
FIG. 5 shows a plan view of the automatic balancing apparatus in accordance with another embodiment of the present invention.

FIG. 5 shows balancing members 41 in accordance with another embodiment of the present invention. The balancing members 41 have balance action sections 412 that include balance storage sections 412a. In this embodiment, the balance storage sections 412a contain balancing mass body 412b in a liquid form. Since the balancing mass body 412b in a liquid form can freely change its shape, the balance storage sections 412a can be formed into any shapes, which improves the degree of freedom in designs.

It is noted that, in the embodiments described above, the balancing members 21 are formed in the same diameter and disposed at locations shifted from one another in the axial direction to avoid mutual contact. In an alternative embodiment, the arm-like connection sections 211 of the balancing members 21 may be formed in different lengths to position the balance action sections 212 at different locations in the radial direction, to thereby place the balance action sections 212 in a non-contact state. As a result, the balancing members 21 can be disposed generally in the same plane, and thus the thickness of the apparatus in the axial direction can be reduced. In this case, the balance action sections 212 may be provided with different masses in order to compensate for the differences in the locations of the balance action sections 212 in the radial direction.

Also, each of the balancing members 21 can be provided with a plurality of balancing mass bodies or may be formed only with a balance action section such as the balance action section 212.

Furthermore, the balance action section 212 of each of the balancing members 21 is not limited to an arcuate shape, and can be formed into other shapes, such as an oval shape or the like.

Figure 6:
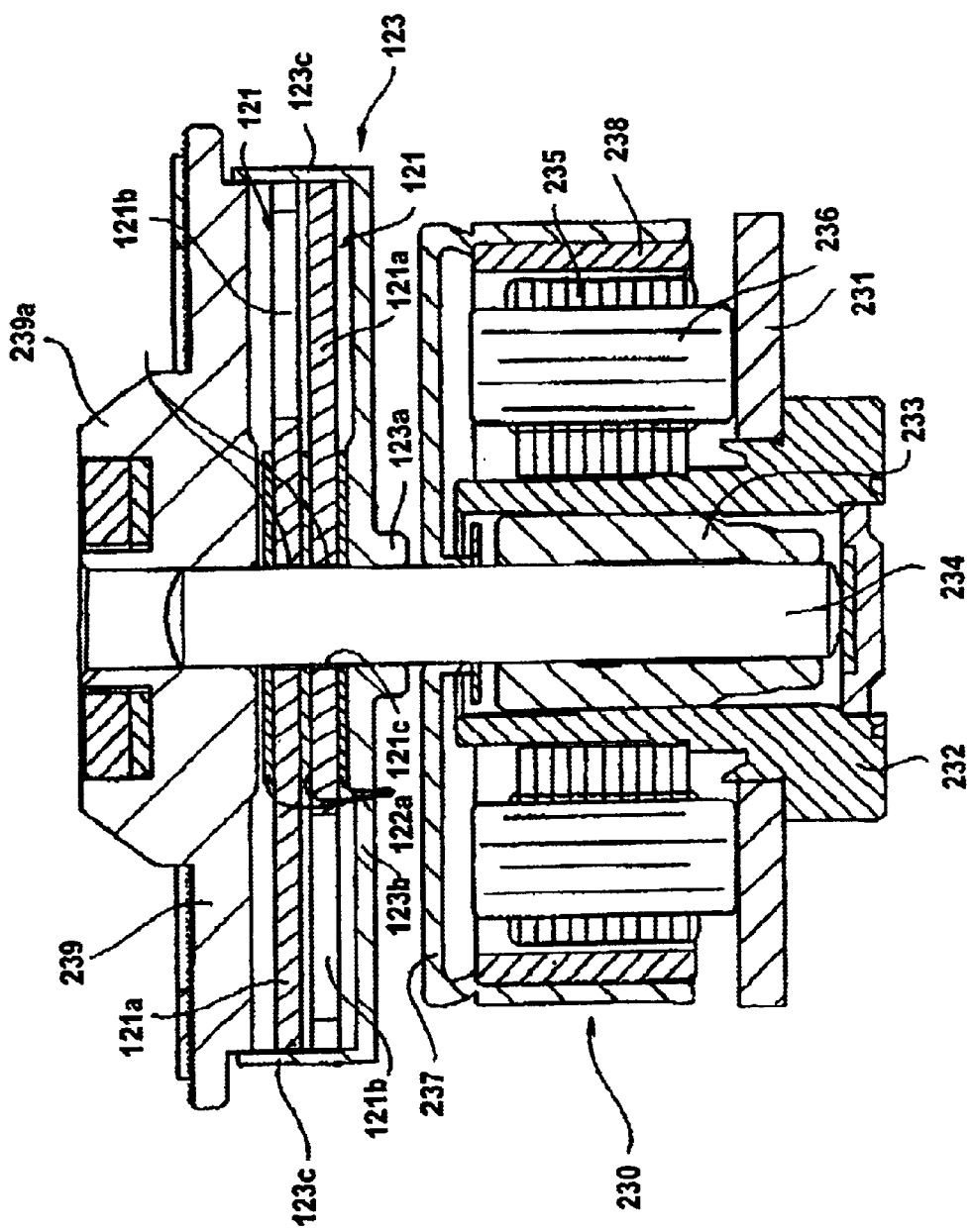
FIG. 6 shows a cross-sectional view of a motor having an automatic balancing apparatus in accordance with another embodiment of the present invention.

FIG. 6 shows a spindle motor 230 in accordance with another embodiment of the present invention. The spindle motor 230 has a cylindrical tubular bearing holder 232 that is mounted on a main frame 231 of a rotary operation device. Bearing members 233 are pressure-inserted in a central bore of the bearing holder 232. Oil-retaining slide bearings are used as the bearing members 233 in this embodiment. However, other types of bearings can be used as the bearing members 233.

A rotor shaft 234 is rotatably supported by the bearing members 233 in the bearing holder 232. A stator core 235 is mounted on an outer peripheral surface of the bearing holder 232. Windings 236 are wound around salient poles of the stator core 235.

A rotor case 237 is affixed on the rotor shaft 234. A rotor magnet 238 is affixed to the rotor case 237. The rotor magnet 238 are disposed around the salient poles of the stator core 235 in a manner that an internal surface of the rotor magnet 238 is disposed opposite to the salient poles of the stator core 235.

A generally circular disc table (e.g., turntable) 239 is affixed to the rotor shaft 234. A pair of balancing members 121 that form an automatic balancing apparatus in accordance with the present embodiment are rotatably mounted with respect to the rotor shaft 234 through bearing members 122 immediately below the disc table 239 in the axial direction. The disc table 239 includes a circular positioning protrusion 239a having a generally conical shaped portion that retains a disc at a predetermined position on the disc table 239.

Nest, a structure of the automatic balancing apparatus shown in FIG. 6 is described in detail.

Figure 7:
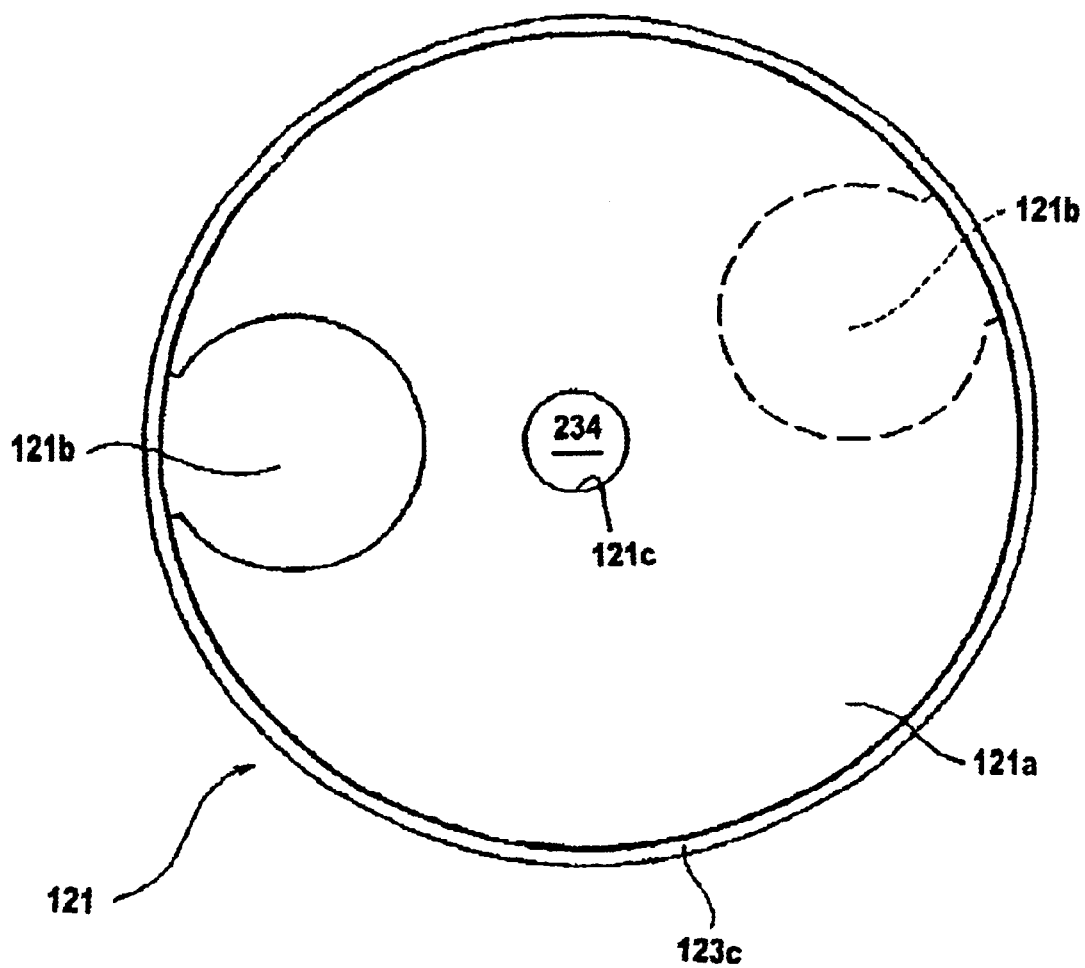
FIG. 7 shows a plan view of the automatic balancing apparatus shown in FIG. 6.
Figure 8:
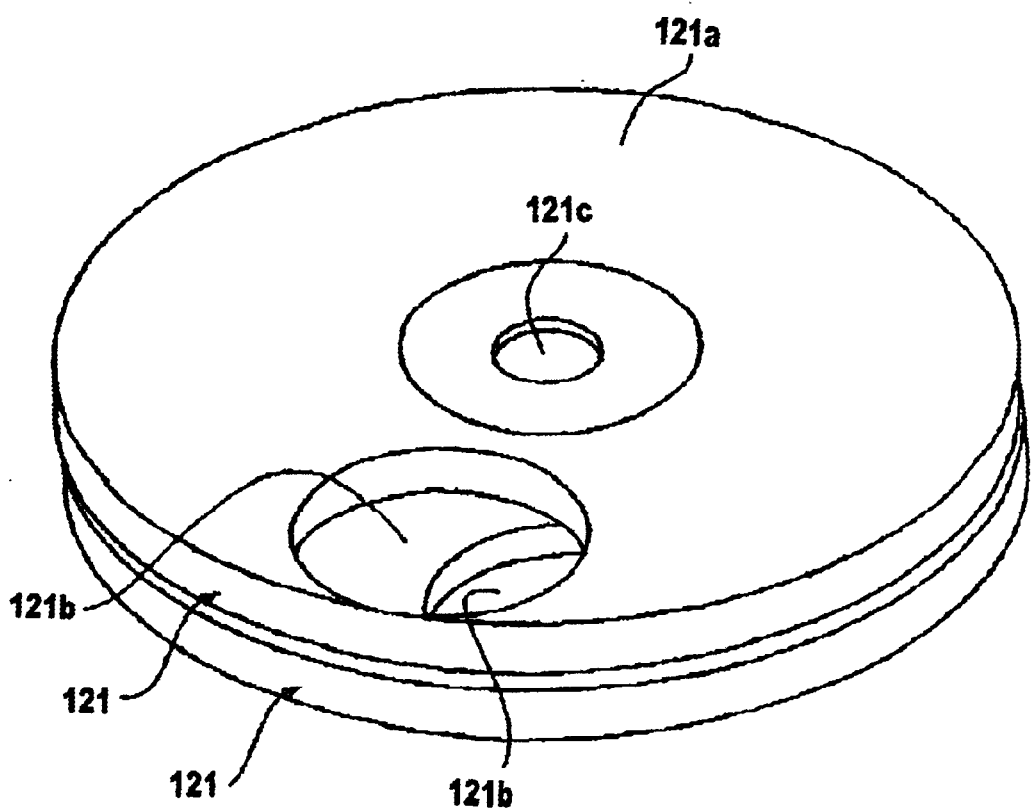
FIG. 8 shows a perspective view of the automatic balancing apparatus shown in FIG. 7.

Each of the pair of the balancing members 121 includes a circular main body section 121a as viewed in plan, as shown in FIGS. 6 and 7. A through hole of a relatively small diameter is formed at one portion on an outer periphery of each of the circular main body sections 121a to define an unbalanced section 121b. Each of the circular main body sections 121a defines a fixing hole 121c at its center that is rotatably mounted on the rotor shaft 234. The pair of the circular main body sections 121a are disposed in proximity to each other in the axial direction. The circular main body sections 121a may preferably be formed from a material having a relatively large specific gravity, such as iron, stainless steel, lead or the like. Other materials may also be used.

The balancing members 121 are sandwiched in a contact manner at central areas thereof by resin sheet members 122a that are made of highly slidable resin such as Teflon or the like. Since the balancing members 121 are sandwiched by the resin sheet members 122a, the balancing members 121 are smoothly rotatable.

The size and position of the unbalanced section 121b may be determined in view of the amount of unbalance of the entire rotator body including a disc. The center of gravity of the circular main body section 121a is eccentrically located on the opposite side of the unbalanced section 121b by an amount determined by the unbalanced section 121b, whereby a balance correction action is attained.

The unbalanced section 121b may be formed in any shape as long as it provides an unbalance in the circular main body 121a. Accordingly, one portion in the circular main body 121a may be removed to define the unbalanced section 121b by forming a recessed section, instead of a through hole. Such recessed section may be formed in any one of shapes including a circular shape.

Figure 9:
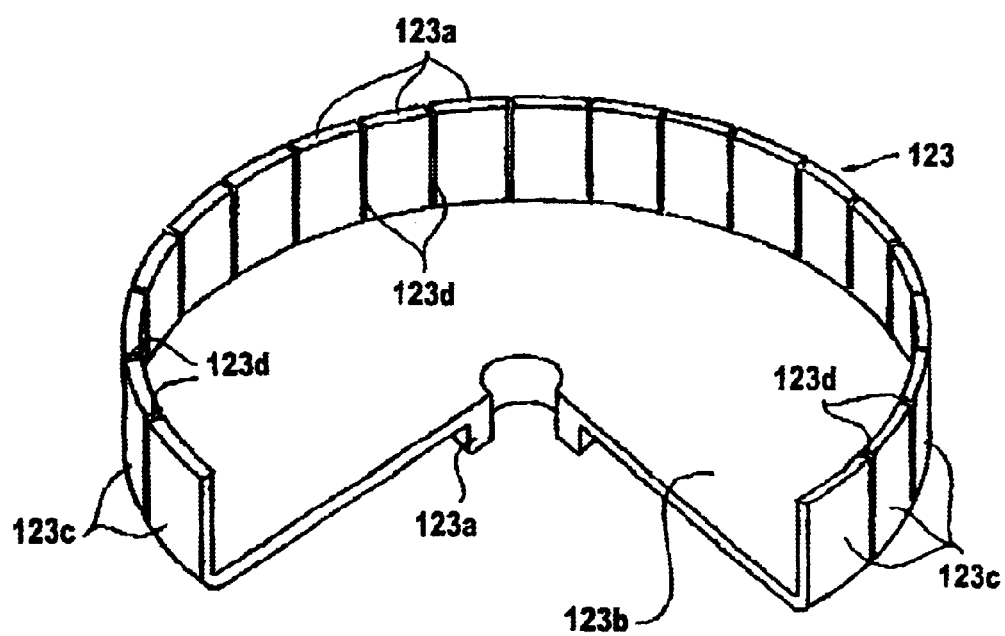
FIG. 9 shows a perspective view of another part of the automatic balancing apparatus shown in FIG. 6.

Furthermore, in accordance with the present embodiment, a rotation-retaining member 123 shown in FIGS. 6 and 9 is provided for the balancing members 121. When the rotator body is rotated at low speeds below the resonance rotation speed CR, the rotation retaining member 123 functions to rotate the balancing members 121 together with the rotor shaft 234. The rotation retaining member 123 has a supporting section 123b in the form of a generally circular disc and a central boss section 123a that is affixed to the rotor shaft 234. A plurality of sliding-contact segments 123c extending upwardly in the axial direction are integrally formed at an outer peripheral section of the disc-like supporting section 123b. The sliding-contact segments 123c are disposed in a circular manner along the entire peripheral section of the supporting section 123b to form a circular sliding-contact section. When the rotator body stops its rotation, internal surfaces of the sliding-contact segments 123c come in pressure-contact with external surfaces of the balancing members 121. By a pressure-contact force caused by the sliding-contact segments 123c, the balancing members 121 are rotated together with the rotor shaft 234.

Slits 123d extending in the axial direction and defining small gaps are provided between adjacent ones of the sliding-contact segments 123c along the peripheral direction thereof. The rotation retaining member 123 including the sliding-contact segments 123c may be entirely formed from a flexible material such as a spring material that can be resiliently deformed. When the rotator body rotates at high speeds faster than the resonant rotational speed CR, free end sections (upper sections in the figure) of the sliding-contact segments 123c open outwardly in the radial direction by a centrifugal force caused by the rotation of the rotator body.

In the embodiment having the structure described above, when the rotator body including the rotor shaft 234, the disc table 239, the disc 12 and the automatic balancing apparatus starts rotation from a stopped state and rotates in a low rotational speed range in which the rotation of the rotator body does not exceed the resonant rotational speed CR, the two balancing members 121 rotate together with the rotor shaft 234 by the retaining action of the sliding-contact segments 123c of the rotation retaining member 123. In other words, a relative speed between the two balancing members 121 and the rotor shaft 234 becomes zero "0". Accordingly, the balance correction action is quickly attained.

As the rotational speed of the spindle motor 230 increases, the centrifugal force increases. When the rotational speed of the spindle motor 230 reaches about the resonant rotational speed CR, the sliding-contact segments 123c of the rotation retaining member 123 is subject to a large centrifugal force, and release the retaining action acting upon the balancing members 121 to allow both of the balancing members 121 to rotate free from the rotor shaft 234. When the rotational speed of the spindle motor 230 exceeds the resonant rotational speed CR, the balancing members 121 that have been allowed to rotate free from the rotor shaft 234 move in directions that cancel the eccentricity in the center of gravity of the rotator body, in other words, a so-called withdrawing phenomenon takes place to cause a balance correction action upon the rotator body.

In this manner, when a disc having a rotational unbalance is rotated on the rotator body, the balancing members 121 move on their own by the balance correction action to appropriate positions, whereby a resultant center of gravity of the rotator body and the disc is located on the rotor shaft 234. As a result, the rotor body rotates without vibrations.

On the other hand, when the rotational speed of the rotator body is reduced after the automatic balancing action has taken place, the sliding-contact segments 123c of the rotation retaining member 123 come in pressure-contact with the outer peripheral surfaces of the balancing members 121 and exerts a retaining action such that the rotation retaining members 213 retain the balancing members 21. At this moment, the rotator body does not have an eccentricity in the center of gravity because the balancing members 121 are located in the positions that cause a balanced state. As a result, the rotation retaining member 123 retains the balancing members 21 in the balanced state in which the eccentricity in the center of gravity of the rotator body is canceled out. Even after the rotation of the spindle motor 13 is stopped, the rotator body maintains its balanced state. Therefore, the rotator body can resume its rotation very smoothly.

In particular, in accordance with the present embodiment, the mass required for the balance correction action is effectively secured along the entire peripheral region of the circular main body sections 121a. As a result, at least one of the external diameters and the thickness of the automatic balancing apparatus can be substantially reduced for a given amount of mass, compared to the conventional apparatus having the fan-shaped balancing members having the same amount of mass. As a result, the entire rotary operation apparatus can be reduced in size and thickness.

Also, in the present embodiment, the unbalanced section 121b is provided as a hole or a recess by removing one portion in a circular shape of the circular main body 121a. Even when the size of the unbalanced section 121b is changed, it is relatively easy to control so as not to change the location of the center of gravity of the unbalanced section 121b, and thus the mass of the balancing member 21 can be readily adjusted.

Furthermore, since the rotation-retaining member 123 has the sliding-contact segments 123c circularly disposed along the entire periphery thereof, the balancing members 121 can be retained by the sliding-contact segments 123c of the rotation-retaining member 123 no matter where the balancing members 121 are positioned. Therefore, once the balancing members 121 are placed in the balanced state, the balancing members 121 are retained by the sliding-contact segments 123c in the balanced state even when a next rotational operation is resumed. As a result, the rotation stability is improved particularly in the low rotation speed region, and the balancing members 121 can move smoothly in a short time for balancing action in the high rotation speed region.

Figure 10:
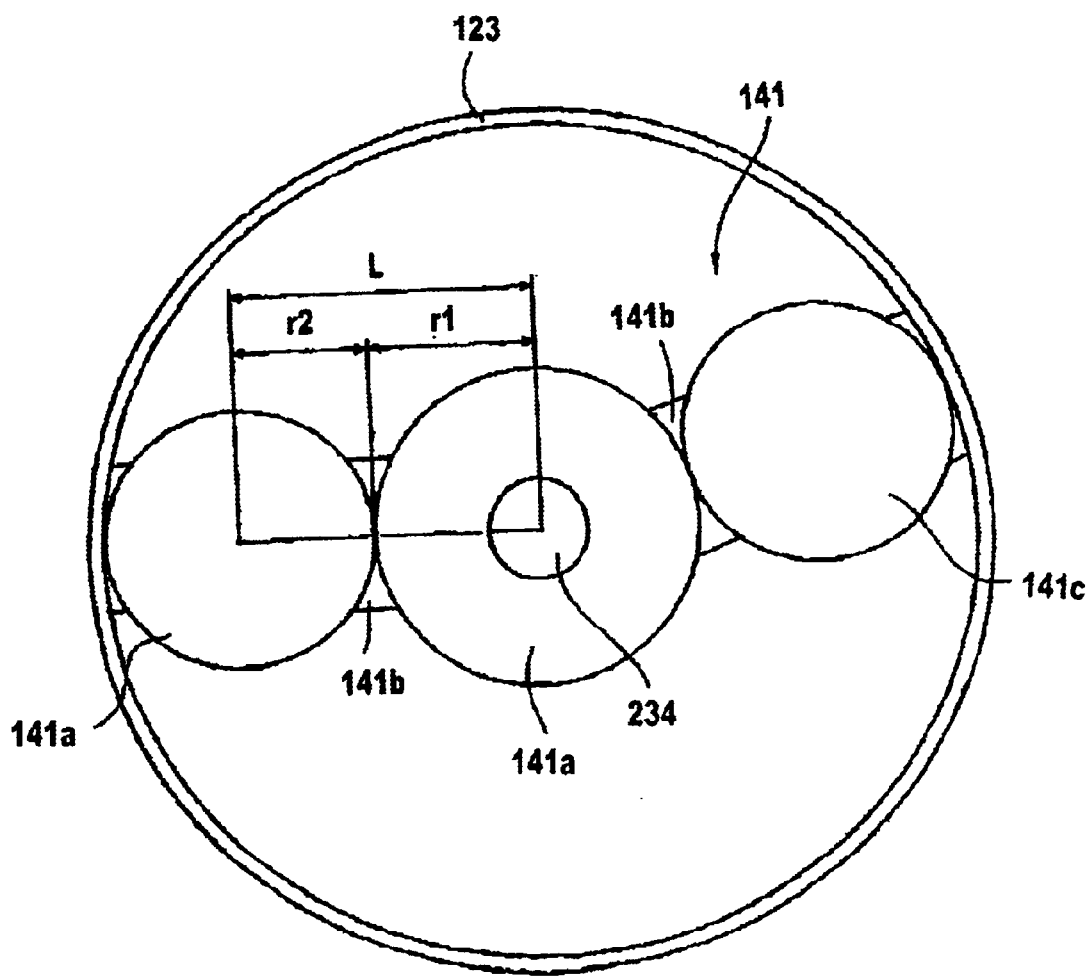
FIG. 10 shows a plan view of an automatic balancing apparatus in accordance with another embodiment of the present invention.
Figure 11:
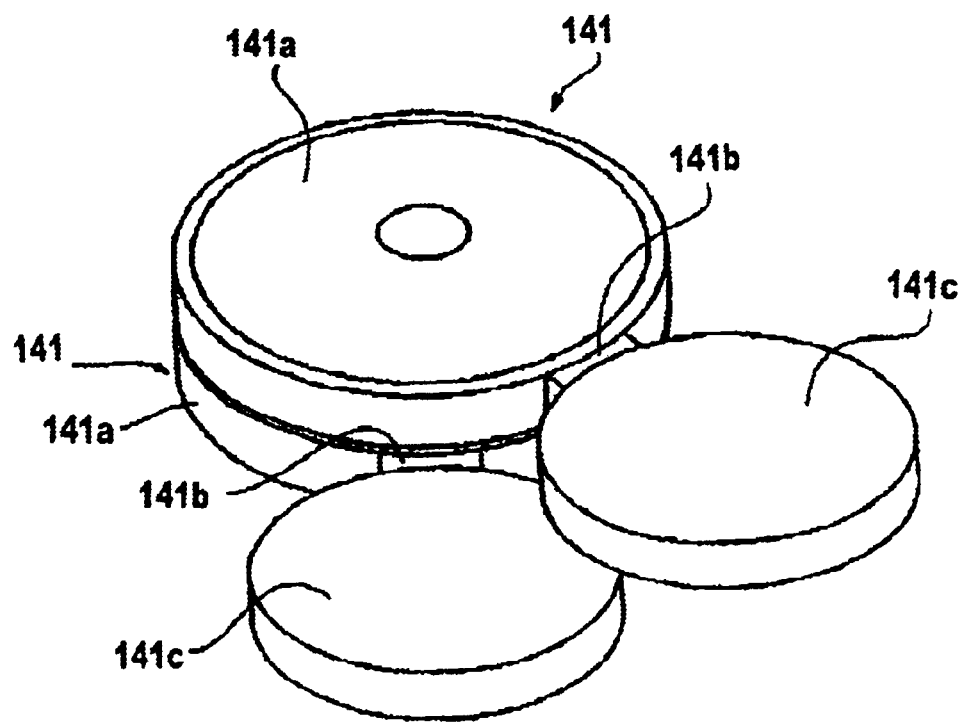
FIG. 11 shows a perspective view of the automatic balancing apparatus shown in FIG. 10.
Figure 12:
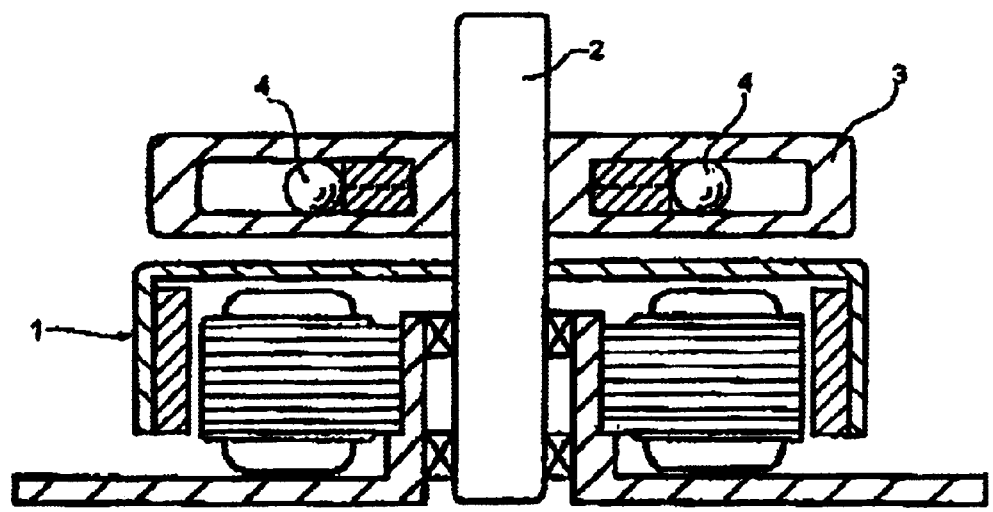
FIG. 12 shows a cross-sectional view of a motor having a conventional automatic balancing apparatus.
Figure 13:
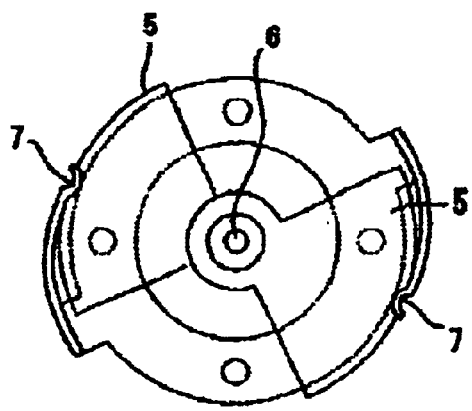
FIG. 13 shows a plan view of another conventional automatic balancing apparatus.

Next, FIGS. 10 and 11 show another embodiment example that is similar to the embodiment examples shown in FIG. 4 and FIG. 7. The example shown in FIGS. 10 and 11 has circular unbalance sections 141c, which are equivalent to the balance action sections 312 formed from metal weights shown in FIG. 4.

Referring to FIGS. 10 and 11, a pair of balancing members 141 are rotatably disposed about the rotor shaft 234 in a non-contact manner in which the balancing members 141 overlap each other in the axial direction without contacting each other. More specifically, each of the balancing members 141 has a central circular section 141a that is rotatably mounted about the rotor shaft 234 and a disc-like unbalance section 141c connecting to an outer peripheral surface of the central circular section 141a through a connection section 141b formed from an arm-like member. The disc-like unbalance section 141c is located outwardly in the radial direction from the central circular section 141a and spaced a distance from the central circular section 141a. The disc-like unbalance section 141c is formed to have a specified mass that appropriately effects the balance correction action. The connection section 141b is formed to have a specified mass that does not substantially affect the balance correction action.

In one embodiment, a radius r1 of the central circular section 141a is larger than a radius r2 of the unbalance section 141c (i.e., r1>r2), and the radius r1 of the central circular section 141a is set to be 0.3L or greater (i.e., r1≧0.3L), where L is a separation between the axial center of the rotor shaft 234 and a center of gravity of the unbalance section 141c (=r1+r2). It is noted that the shape of the unbalance section 141c is not limited to a circular shape. However, when the unbalance section 141c is formed in a shape other than a circular shape as viewed in plan, the shape of the unbalance section 141c is converted to a circular shape with respect to the balance correction action, and the radius r1 of the central circular section 141a is set to be greater than a radius of the converted circular shape.

A rotation retaining member 123 similar to the one described above with reference to FIG. 9 may be provided for the balancing members 141 of the present embodiment.

In accordance with the present embodiment, since the central circular section 141a is employed, an extreme cantilever structure of the conventional apparatus is eliminated, and therefore highly stable rotational operations can be obtained from a low rotational speed state to a high rotational speed state.

In this embodiment, when the central circular section 141a is made larger than the unbalance section 141c, a central area of the balancing member 141 is more stably supported.

In accordance with one embodiment of the present invention, the rotation-retaining member 123 described above may be formed from one pair of rotation-retaining members disposed facing to each other in the axial direction, and each one of the pair of the rotation-retaining members may be provided for each one of the pair of balancing members 121 (141), such that each one of the pair of the rotation-retaining members retains each one of the pair of balancing members 121 (141), respectively. As a result, the retaining action against the pair of the balancing members is evenly conducted by the pair of the corresponding rotation-retaining members 123, which results in a smoother balancing action.

Also, the arm-like connection sections 141b at the unbalance sections 141c may be formed in different lengths such that the arm-like connection sections 141b are disposed in a non-contact manner in the axial direction, in other words, the arm-like connection sections 141b do not contact each other in the axial direction. As a result, the unbalance sections 141c can be disposed generally in the same plane, and therefore the thickness of the automatic balancing apparatus can be reduced in the axial direction. In this case, the unbalance sections 141c may be provided with different masses in order to compensate for the differences in the locations of the unbalance sections 141c in the radial direction.

Furthermore, each of the unbalance sections 121c or 141c of the balancing members 121 or 141 may not be limited to a circular shape, and can be formed into different shapes including an oval shape, a polygonal shape and the like.

While the description above refers to particular embodiments of the present invention, it will be understood that many modifications may be made without departing from the spirit thereof. The accompanying claims are intended to cover such modifications as would fall within the true scope and spirit of the present invention.

For example, the present invention is applicable not only to CD-ROM drive apparatuses described above, but also to a variety of other types of apparatuses. The present invention is also applicable to other types of motors including servomotors, air-motors and the like.

In accordance with one embodiment of the present invention, an automatic balancing apparatus has balancing members having balance action sections with appropriate masses that are required for a balance correction action. The balance action sections are spaced a specified distance from a rotor shaft in the radial direction such that the center of gravity of each of the balancing members is shifted outwardly from the rotor shaft in the radial direction. As a result, a smaller sized automatic balancing apparatus can achieve a better balance correction action compared to the conventional automatic balancing apparatus having fan-shaped balancing members. Moreover, an excellent balance correction action of the balancing members can be achieved with a simplified and smaller structure.

In accordance with another embodiment of the present invention, an automatic balancing apparatus has a circular main body section with one portion thereof being removed to define an unbalance section. As a result, a mass required for a balance correction action can be effectively secured along an entire peripheral region of the circular main body section, and therefore the automatic balancing apparatus can be reduced in size and thickness. Also, the automatic balancing apparatus of the present invention eliminates an extreme cantilever structure such as the one employed in the conventional apparatus, and therefore highly stable rotational operations can be obtained from a low rotational speed state to a high rotational speed state. Accordingly, an excellent balance correction action of the balancing members can be achieved with a simplified and smaller structure, and also the rotation stability is improved.

Moreover, in accordance with another embodiment of the present invention, an automatic balancing apparatus has a rotation retaining section having sliding-contact sections circularly disposed along generally the entire outer periphery of the rotation retaining section. As a result, the balancing members can be retained by the rotation retaining section no matter what angular positions the balancing members are located. When the balancing members are placed in a balanced state, the sliding-contact sections retain the balancing members in the balanced state. As a result, the rotation stability is improved particularly in the low rotation speed region, and the balancing members can move smoothly and quickly in a short time to appropriate locations for balancing actions in the high rotation speed region. Consequently, the rotation stability and performance of a rotary drive apparatus is improved.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automatic balancing apparatus defining an axis of rotation at a rotatable shaft, the apparatus comprising:

a plurality of balancing members rotatable with respect to the rotatable shaft, each of the balancing members having a balance action section spaced a specified distance in a radial direction from the axis of rotation and a connection section that is fixed with respect to the balance action section and that rotatably couples the balance action section to the shaft;

wherein the connection section has a generally uniform width along a longitudinal direction extending radially outward from the shaft to the unbalance section; and wherein the balance action section has a mass that effects a balance correction action, and the connection section has a mass that effects a balance correction action to a degree substantially less than the mass of the balance action section.

2. An automatic balancing apparatus according to claim 1, wherein the balance action section is formed from an arcuate body that is attached to an outer end section of the connection section that extends in the radial direction.

3. An automatic balancing apparatus according to claim 1, wherein each of the balancing members has a central circular section rotatable with respect to the rotatable shaft, an unbalance section that includes the balance action section and a connection section that connects the unbalance section to the central circular section, wherein the unbalance section has a mass that effects the balance correction action, and the central circular section has a mass greater than the mass of the unbalance section.

4. An automatic balancing apparatus according to claim 3, wherein the central circular section has a radius of 0.3L or greater, where L is a distance between the axis of rotation and a center of gravity of the unbalance section.

5. An automatic balancing apparatus according to claim 7, wherein the unbalance section has a circular disc shape.

6. An automatic balancing apparatus in combination with a rotator body, the rotator body having a rotary shaft defining an axis of rotation, the automatic balancing apparatus comprising:
   a plurality of balancing members rotatable about the rotary shaft, each of the balancing members having a balance action section spaced a distance in a radial direction from the axis of rotation, wherein the balance action sections do not contact one another and a connection section that rotatably couples the balance action section to the rotary shaft;
   wherein the connection section has a generally uniform width along a longitudinal direction extending radially outward from the shaft to the unbalance section; and
   wherein the balance action section has a mass that effects a balance correction action to cancel a rotational unbalance of the rotator body when the rotator body rotates at a rotational speed that exceeds its resonant rotational speed, and the connection section has a mass that effects a balance correction action to a degree substantially less than the mass of the balance action section.

7. An automatic balancing apparatus according to claim 6, wherein each of the balancing members has a central circular section rotatable with respect to the rotatable shaft, an unbalance section that includes the balance action section and a connection section that connects the unbalance section to the central circular section, wherein the unbalance section has a mass that effects the balance correction action, and the central circular section has a mass greater than the mass of the unbalance section.

8. An automatic balancing apparatus according to claim 7, wherein the central circular section has a radius of 0.3 L or greater, where L is a distance between the axis of rotation and a center of gravity of the unbalance section.

9. An automatic balancing apparatus according to claim 6, wherein the unbalance section has a circular disc shape.

10. An automatic balancing apparatus defining an axis of rotation at a rotatable shaft, the apparatus comprising:
    a plurality of balancing members rotatable with respect to the rotatable shaft, each of the balancing members having a connecting arm member and a balance action section that is fixed with respect to the connecting arm member and spaced a specified distance in a radial direction from the axis of rotation, wherein the connecting arm member rotatably couples the balance action section to the shaft;
    wherein the balance action section has a mass that effects a balance correction action, and the connection section has a mass that effects a balance correction action to a degree substantially less than the mass of the balance action section.

11. The automatic balancing apparatus of claim 10, wherein the connecting arm member has a generally uniform width along a longitudinal direction radially outward from the shaft.

12. The automatic balancing apparatus of claim 11, wherein the connecting arm member is thin and narrow relative to the balance action section.

13. The automatic balancing apparatus of claim 10, wherein the balance action section has the configuration of an arc with the axis of rotation at the arc's radial center.

14. The automatic balancing apparatus of claim 13, wherein the arc defines less than a full circle.

* * * * *